United States Patent
Peng et al.

(10) Patent No.: US 8,605,556 B1
(45) Date of Patent: Dec. 10, 2013

(54) CHANNEL WAVEGUIDE EXTENDING INTO A GAP OF A NEAR-FIELD TRANSDUCER

(71) Applicant: Seagate Technology LLC, Cupertino, CA (US)

(72) Inventors: Chubing Peng, Minnetonka, MN (US); Yongjun Zhao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/675,812

(22) Filed: Nov. 13, 2012

(51) Int. Cl.
*G11B 11/00* (2006.01)

(52) U.S. Cl.
USPC ..................... 369/13.33; 369/13.13

(58) Field of Classification Search
USPC .......... 369/13.33, 13.13, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | |
|---|---|---|
| 7,330,404 B2 | 2/2008 | Peng et al. |
| 2005/0078565 A1* | 4/2005 | Peng et al. ............. 369/13.33 |
| 2007/0115787 A1* | 5/2007 | Itagi et al. ............. 369/13.33 |
| 2009/0116804 A1* | 5/2009 | Peng et al. ............. 385/131 |
| 2010/0073817 A1* | 3/2010 | Takayama et al. ...... 369/13.33 |
| 2010/0097901 A1 | 4/2010 | Challener |
| 2010/0328807 A1 | 12/2010 | Snyder et al. |
| 2011/0002199 A1 | 1/2011 | Takayama et al. |
| 2013/0064051 A1* | 3/2013 | Peng et al. ............. 369/13.33 |

* cited by examiner

*Primary Examiner* — Tan X Dinh

(74) *Attorney, Agent, or Firm* — Hollingsworth Davis, LLC

(57) ABSTRACT

An apparatus includes a near-field transducer that having two metal elements configured as side-by-side plates on a substrate-parallel plane with a gap therebetween. The gap is disposed along the substrate-parallel plane and has an output end at a media-facing surface, and an input end opposite the output end. A channel waveguide is configured to deliver light to the input end of the near-field transducer. The channel waveguide has a core and cladding, and a portion of the core extends into the gap of the near-field transducer.

19 Claims, 8 Drawing Sheets

CHANNEL WAVEGUIDE EXTENDING INTO A GAP OF A NEAR-FIELD TRANSDUCER

SUMMARY

Examples described herein are directed to a channel waveguide that extends into a gap of a near-field transducer. In one embodiment, an apparatus includes a near-field transducer that having two metal elements configured as side-by-side plates on a substrate-parallel plane with a gap therebetween. The gap is disposed along the substrate-parallel plane and has an output end at a media-facing surface, and an input end opposite the output end. A channel waveguide is configured to deliver light to the input end of the near-field transducer. The channel waveguide has a core and cladding, and a portion of the core extends into the gap of the near-field transducer.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

In heat-assisted magnetic recording (HAMR), also sometimes referred to as thermal-assisted magnetic recording (TAMR), a magnetic recording media (e.g., hard drive disk) is able to overcome superparamagnetic effects that limit the areal data density of typical magnetic media. In a HAMR recording device, information bits are recorded on a storage layer at elevated temperatures. The heated area in the storage layer determines the data bit dimension, and linear recording density is determined by the magnetic transitions between the data bits.

In order to achieve desired data density, the HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT receives light from an optical waveguide, e.g., structure with high contrast in the refractive index between the waveguide core and its cladding portions. Light propagating in the waveguide is focused by an optical focusing element, such as a planar solid immersion mirror (PSIM) into an optical NFT.

The NFT is designed to reach local surface-plasmon at a designed light wavelength. At resonance, high electric field surrounds the NFT due to the collective oscillation of electrons in the metal. Part of the field will tunnel into a storage medium and get absorbed, raising the temperature of the medium locally for recording.

One of the challenges in heating the media surface using an NFT is delivery of sufficient energy to the media. As with any energy delivery system, the optical pathway from the light source (e.g., laser) and target (e.g., media) will have losses that lead to less energy being delivered to the media surface than is provided by the light source. In the present disclosure, methods and apparatuses are described that are designed to reduce energy losses when coupling a waveguide to an NFT. For example, the NFT under consideration is configured as side-by-side, plate-like structures with a gap therebetween. One way to focus light on this type of NFT is via a PSIM. However, as discussed in greater detail below, the alignment between a PSIM and gap-type NFT may be sensitive to manufacturing variances. These variances may result in lowered coupling efficiency. Accordingly, various integrated optics waveguides geometries and materials are described that may provide desired coupling efficiency to this type of NFT, and may be less sensitive to manufacturing variations/tolerances.

Figure 1:
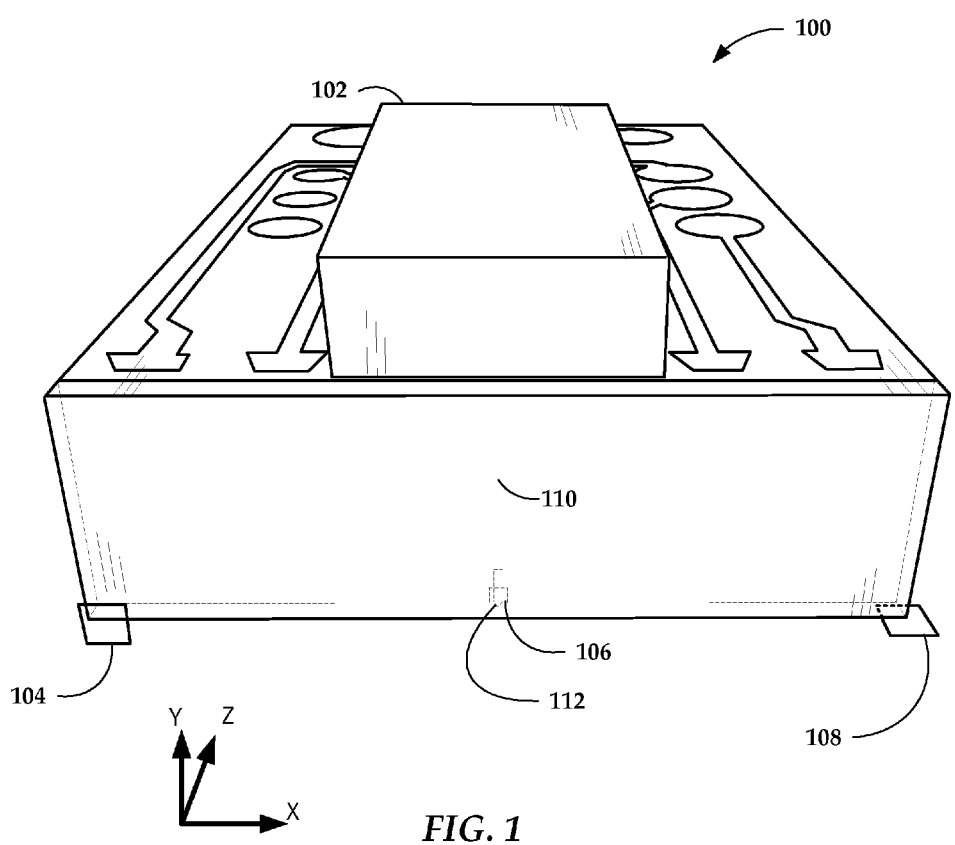
FIG. 1 is a perspective view of a slider according to an example embodiment.

In reference now to FIG. 1, a perspective view shows a HAMR slider 100 that may be used in a disk drive apparatus according to an example embodiment. This slider 100 is an example of a laser-on-slider configuration. The slider 100 includes a laser diode 102 on top of the slider body and near a trailing edge 104 of the slider 100. The laser diode 102 provides electromagnetic energy to heat the media surface at a point near to a HAMR read/write head 106, the read/write head 106 located at a media-facing surface 108. The media-facing surface 108 may be referred to as an air-bearing surface (ABS) on hard disk sliders. The media-facing surface 108 faces and is held proximate to a moving media surface (not shown) during device operation.

Optical coupling components, such as a waveguide 110, are formed integrally within the slider device 100 to deliver light from the laser 102 to the media. For example, a waveguide and near-field transducer (NFT) 112 may be located proximate the read/write head 106 to provide local heating of the media during write operations. The laser diode 102 in this example may be an edge firing device, e.g., delivering light along the z-axis, the light being reflected into the waveguide 110 by a mirror or similar device. It will be appreciated that the waveguide 110 and NFT 112 may be used with any light source and light delivery mechanism. For example, surface emitting lasers (SEL) may be used instead of edge firing lasers. The slider 100 may use an integrated laser located on the top, side, trailing edge, etc., and/or the light may be provided by an externally mounted laser (not shown).

Figure 2A:
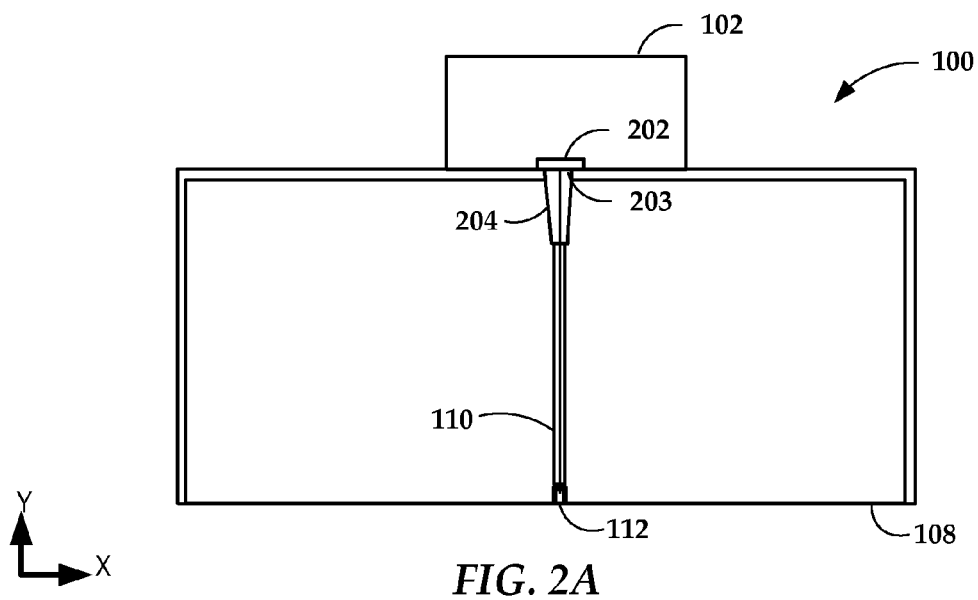
FIGS. 2A and 2B are views of trailing edge of sliders showing optical paths according to example embodiments.
Figure 2B:
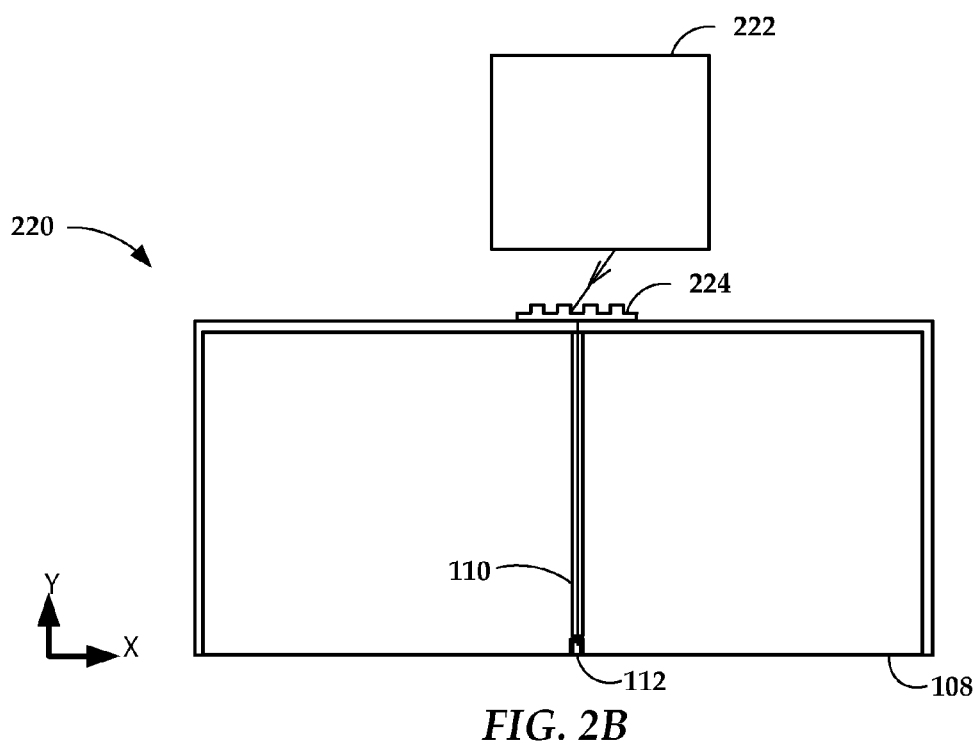

In reference now to FIGS. 2A and 2B, block diagrams illustrate slider-integrated optical pathways in laser-in-slider and free space light delivery devices according to example embodiments. In FIG. 2A, slider 100 of FIG. 1 is viewed from the trailing edge on the xy-plane. An output facet 202 of the laser 102 is coupled to an input facet 203 of a tapered waveguide input coupler 204 (e.g., by butting the facet of the laser 102 to a facet of the coupler 204). The waveguide input coupler 204 couples light to the waveguide 110 that delivers light to the NFT 112 proximate the media-facing surface 108. The coupler 204, waveguide 110, and other components described below may be formed on a common substrate plane (or substrate-parallel plane) that includes the NFT 112.

In FIG. 2B, an end view (e.g., of trailing edge) of a free space delivery slider 220 shows an alternate arrangement for delivering energy to the NFT 112. A light source 222 (e.g., laser) is coupled to deliver light to the slider 220 via an optical delivery media, e.g., an optical fiber. The light is directed to a free space coupling interface in the slider, here shown as a grating coupler 224. The grating coupler 224 directs light to an internal light delivery structure of the slider 220, e.g., waveguide 110. Light propagates through the waveguide 110 where it is directed to the NFT 112. The optical pathways shown in FIGS. 2A and 2B may also include other components not shown, such as couplers, decouplers, collimators, focusers, devices for shifting phase and field orientation of the light, etc.

In the present disclosure, the waveguide 110 is configured at least in part as a channel waveguide with features that facilitate efficiently coupling waveguide output to the NFT 112. These waveguide configurations may be used in a laser-in-slider, free space delivery, or any other light delivery arrangement. In reference now to FIG. 3A, a perspective view illustrates features of an NFT-waveguide interface according to an example embodiment.

Figure 3A:
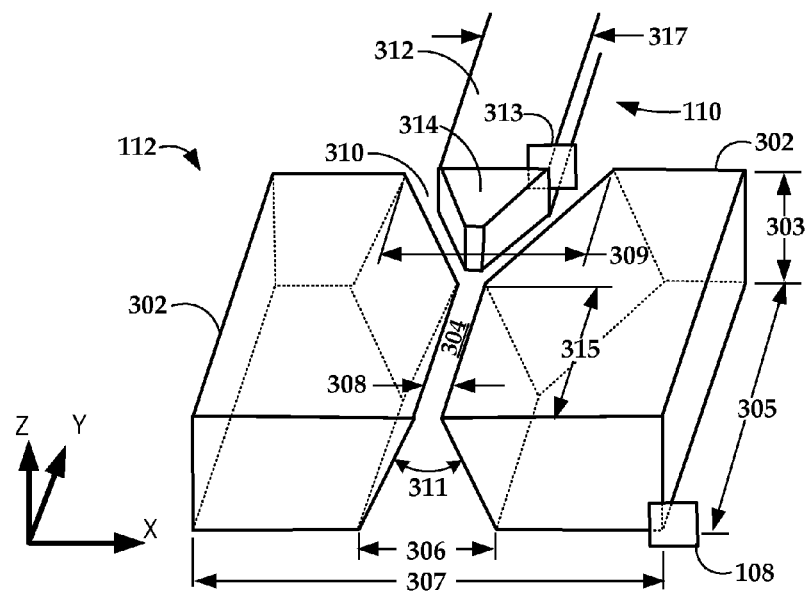
FIGS. 3A, 3B and 4 are perspective views showing channel waveguide and near-field transducer configurations according to example embodiments.

The view in FIG. 3A is from a location at or near the media-facing surface 108. Light is delivered along a negative direction of the y-axis, wherein it is directed out the media-facing surface 108 by the NFT 112. The NFT 112 has two plate-like, metallic elements 302 with a gap 304 therebetween. The structures 302 are formed of a plasmonic metal (e.g., Au, Ag, Cu, and alloys thereof) and the gap 304 is filled with a dielectric material. The elements 302 act as cladding for a ridge waveguide, the core of which is formed by a dielectric material in the gap 304. The gap 304 has a wider bottom opening dimension 306 than the top opening dimension 308. The gap 304 also has a tapered opening 310 where light is coupled into the ridge waveguide. While dimensions, features, and proportions of an NFT 112 according to example embodiments may differ from what is illustrated in FIG. 3A, generally the NFT 112 will include structures 302 that at least form a gap 304 that is tapered along the y-axis with differing gap dimensions 306, 308, and a taper 310 at an input end of the NFT gap 304, e.g., end facing away from the media-facing surface 108. The NFT gap 304 has an output end at or near the media-facing surface 108.

Transverse electric polarized light propagating through the waveguide 110 is coupled to the tapered opening 310 of the ridge waveguide of the NFT 112. Light waves propagating through the ridge waveguide bend upward toward the narrow portion of the gap 304, which has higher effective refractive index than the wider portion of the gap 306. Local surface plasmon resonance is reached by tuning the bottom open width 306 at a desired excitation wavelength. The waveguide length 305 is optimized at Fabry-Perot resonance. Resonance and light focusing capability results in large amount of optical energy condensed inside the gap 304 onto the media-facing surface 108, where it can be coupled into a storage medium for heat-assisted recording.

One way of delivering light to the NFT 112 is using a parabolic, planar, solid immersion mirror (SIM) (not shown). In such a case, the NFT 112 is located in a focal point of the SIM. It has been found that it is difficult to control precisely the longitudinal position (along the y-axis) of the SIM focus relative to the NFT 112 due to manufacturing variations of the SIM. It has also been difficult to align components along the lateral position (along the x-axis) due to the asymmetry variations between the left and right SIM sidewalls. The shift from optimal focal position may decrease NFT efficiency and wafer yields when a SIM is used, at least with this type of NFT 112.

Another way to deliver light into the NFT uses a three-dimensional, dielectric, channel waveguide 110, as shown in FIG. 3A. Material (not shown) surrounding a core 312 has a different index of refraction than the core material, thereby forming a transverse electric (TE) mode channel waveguide. The positioning of the channel waveguide 110 relative to the NFT 112 is determined by a wafer fabrication overlay, which can currently control features to a 10-nm scale. Using a channel waveguide 110 also eases the optical path for light delivery. However, in previous implementations, the NFT 112 excited by a channel waveguide had only about half the coupling efficiency of the SIM, due to the lack of high-angle optical rays emitting from the channel waveguide. Various features of the waveguide 110 disclosed below have been found to improve the NFT efficiency with a TE mode channel waveguide 110.

The core portion 312 of the channel waveguide 110 has a rectangular cross-section that extends along the light delivery axis (y-direction). To obtain good NFT efficiency, one strategy is to improve the mode-match between the channel waveguide 110 and NFT 112 at the entrance near tapered opening 310. In previous configurations configuration, the channel waveguide core 312 was truncated at plane 313, and optimized to have the finest mode confinement. This truncated configuration was found to have theoretical maximum coupling efficiency significantly less than that of a SIM.

In an example configuration seen in FIG. 3A, the channel waveguide core 312 has a portion 314 that extends into the tapered opening 310 of the NFT 112. In this configuration, the portion 314 is tapered at an angle similar to the taper of the opening 310. The de-localization of the channel waveguide mode and the insertion enhance the impedance mismatch, and therefore, the excitation of surface-plasmons. As shown in FIG. 3A, the z-dimension of the tapered portion 314 remains substantially constant along the y-axis, while the x-dimension is reduced. In other configurations, the cross-section of the tapered portion 314 may be congruent along the y-axis, e.g., xz-cross-sections having a constant ratio of x- and z-dimensions along the y-direction. In other variations, the x-dimension of the top of the tapered portion 314 may narrow along the y-direction more quickly than the x-dimension of the bottom portion along the same direction, so that an xz-plane cross-section at the furthest extension of the portion is triangular (or trapezoidal) instead of rectangular as seen here. This type of narrowing of tapered portion 314 can be seen in FIG. 3B.

Figure 3B:
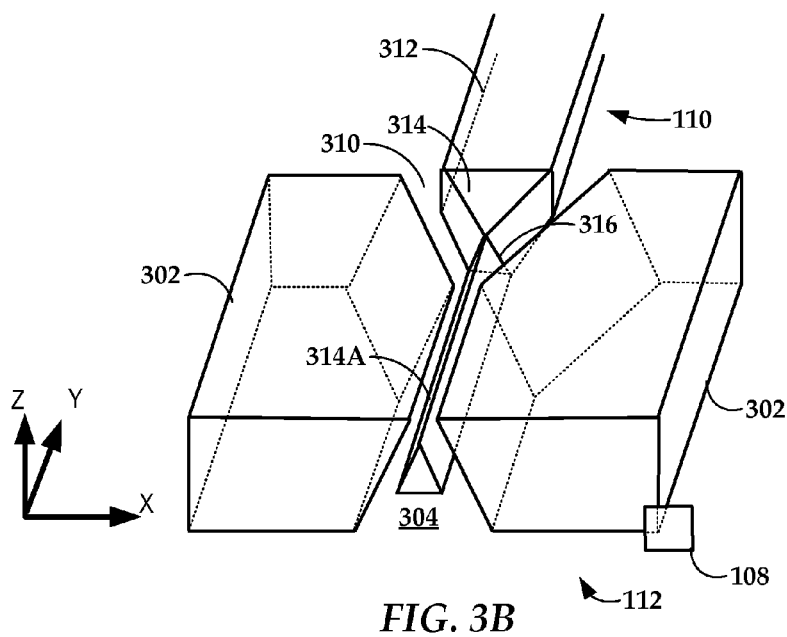

In FIG. 3B, a perspective view similar to that of FIG. 3A shows an alternate configuration of waveguide 110. As noted above, the tapered portion 314 narrows at the top so that an xz-plane cross-section at transition 316 is triangular. An extension 314A of the portion 314 extends from the transition 316 into the tapered gap 304 between elements 302. This extension 314A may be disposed along the y-direction all the way up to the media-facing surface 108. In other configurations, the extension 314A may be truncated anywhere in between the transition 316 and media-facing surface 108.

Figure 4:
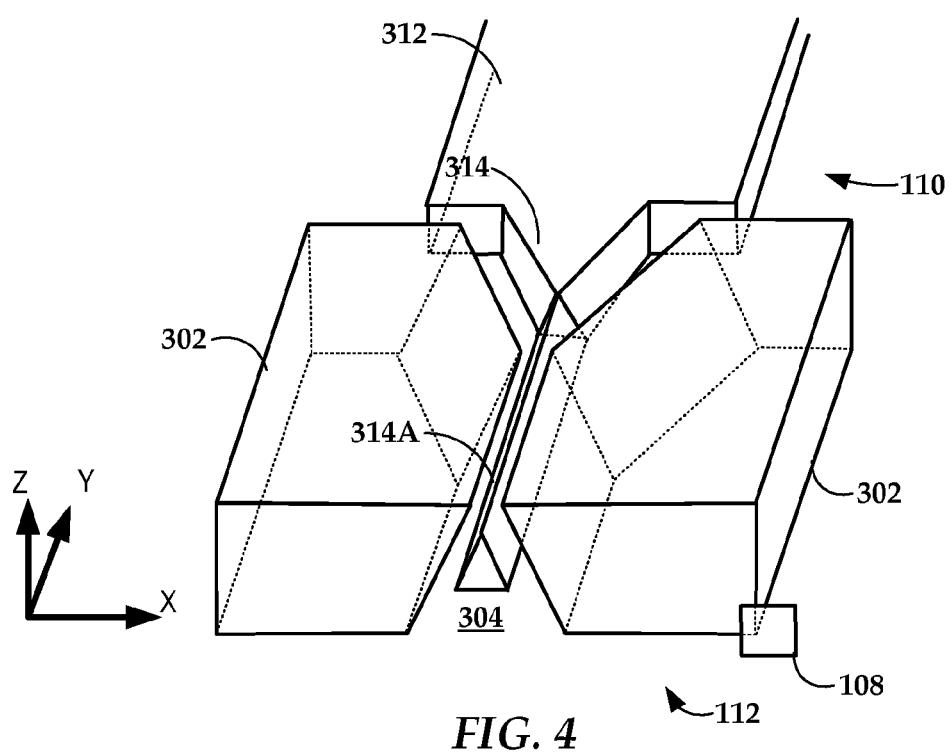

The gap between extension 314A and metal elements 302 may be filled with a material of low index of refraction, such as silica. The low-index gap material reduces the light absorption in the NFT 112 and increases the NFT output efficiency. In yet another configuration seen in FIG. 4, the channel waveguide core portion 312 may be wider than the NFT entrance/opening 310. This configuration may ease channel waveguide light delivery and/or fabrication.

To demonstrate the effectiveness of these approaches, FIGS. 5A-6B show results of a parametric search where coupling efficiencies of various configurations were evaluated.

For this analysis, an NFT 112 as shown in FIG. 3A was used. The analyzed NFT 112 has fixed cross-section with the following dimensions: top gap width 308 (W)=20 nm, bottom gap width 306 ($W_b$)=260 nm, height 303 (H)=450 nm, overall width 307 ($W_1$)=720 nm, linear tapering of the entrance 310=33.6°.

For the cases shown in FIGS. 5A-6B, the NFT gap straight part length 315 ($L_1$) is varied to determine optimum NFT efficiency for different values of waveguide width 317 ($W_c$), entrance opening width 309 ($W_e$), and taper angle 311 (θ). The channel waveguide core portion 312 includes a 200-nm thick ($H_e$, z-direction dimension) $Ta_2O_5$ core of index of refraction n=2.09, cladded by $Al_2O_3$ of n=1.65. The storage medium is placed underneath the NFT head and includes a 12.6-nm thick FePtCuC magnetic layer of n=2.54+j 1.527 and a 20 nm thick MgO layer of n=1.7 on a silicon substrate. The head-media spacing is 8 nm with effective index of refraction n=1.2116. Light wavelength λ=830 nm.

Figure 5A:
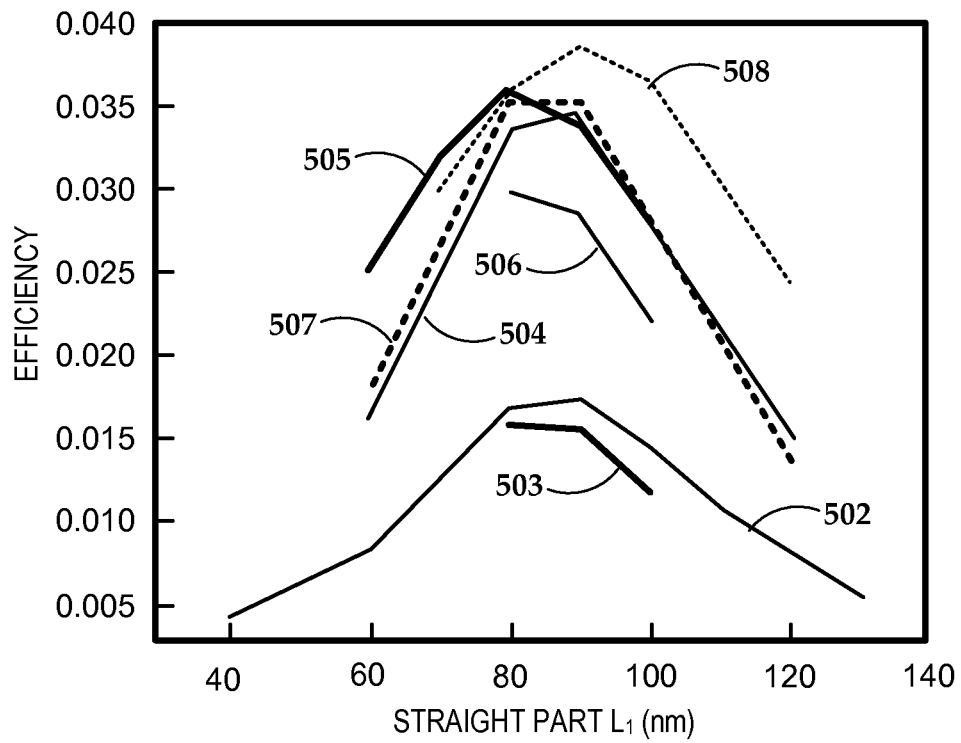
FIGS. 5A, 5B, 6A and 6B are charts showing coupling efficiency for different geometric parameters of waveguide and near field transducer arrangements according to example embodiments.
Figure 5B:
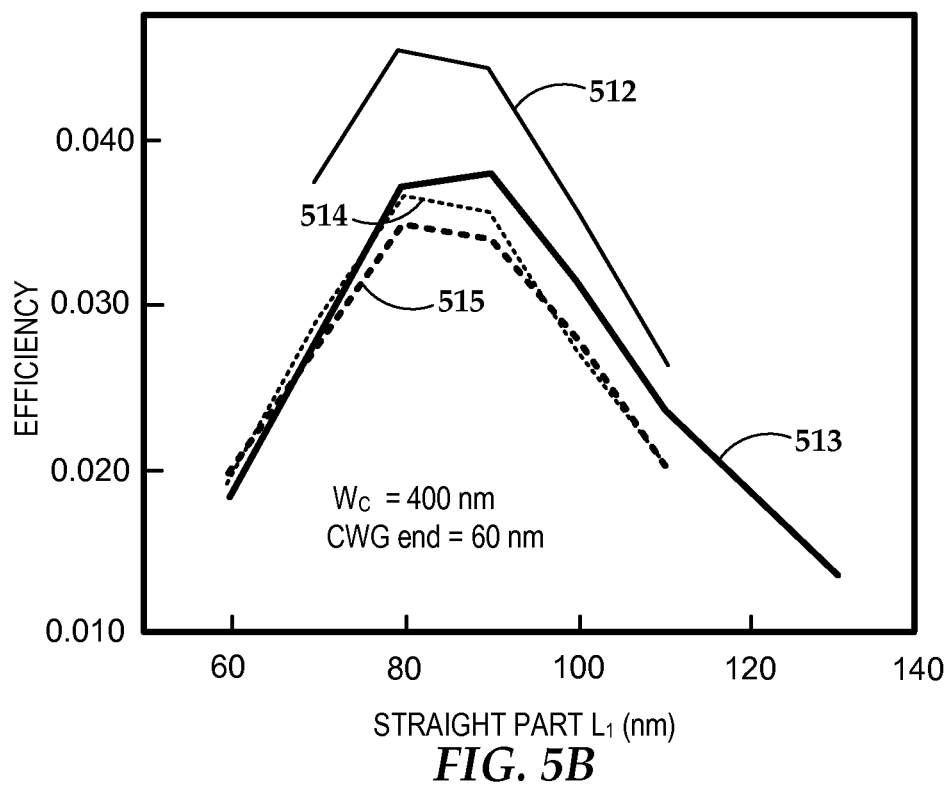

In FIGS. 5A-5B and 6A-6B, graphs show calculated efficiency curves for various NFT geometries. The analysis results shown in FIG. 5A is for a waveguide geometry as shown in FIG. 3A truncated at surface 313 (e.g., without portion 314), whereas the results shown in FIG. 5B is for a waveguide geometry that includes the portion 314. The analysis results of FIG. 6A corresponds to the waveguide geometry shown in FIG. 3B, and the results in FIG. 6B corresponds to the geometry shown in FIG. 4. The various parameters used to obtain the curves in FIGS. 5A-5B and 6A-6B are detailed below in Tables 1-4, respectively. For purposes of this analysis, NFT efficiency is defined as the light absorbed in the magnetic storage layer in a footprint of 50 nm by 50 nm, and plotted in the graphs as a function of NFT gap straight part length 315 ($L_1$). The highest efficiency of these configuration is shown in curve 613 in FIG. 6B, which exhibits a peak efficiency greater than about 6.5%. This efficiency is similar to what was observed when a PSIM was used to illuminate a similarly configured NFT 112.

TABLE 1

Parameters used to obtain results shown in FIG. 5A

| Curve Ref. No. | $W_c$ (317) | θ (311) | $W_e$ (309) |
|---|---|---|---|
| 502 | 150 nm | 67.4° | 420 nm |
| 503 | 150 nm | 90.0° | 420 nm |
| 504 | 400 nm | 67.4° | 420 nm |
| 505 | 400 nm | 53.1° | 420 nm |
| 506 | 400 nm | 79.6° | 520 nm |
| 507 | 500 nm | 67.4° | 420 nm |
| 508 | 400 nm | 67.4° | 420 nm ($SiO_2$ gap) |

TABLE 2

Parameters used to obtain results shown in FIG. 5B ($W_c$ = 400 nm)

| Curve Ref. No. | θ (311) | $W_e$ (309) |
|---|---|---|
| 512 | 67.4° | 460 nm |
| 513 | 90.0° | 460 nm |
| 514 | 90.0° | 560 nm |
| 515 | 90.0° | 620 nm |

TABLE 3

Figure 6A:
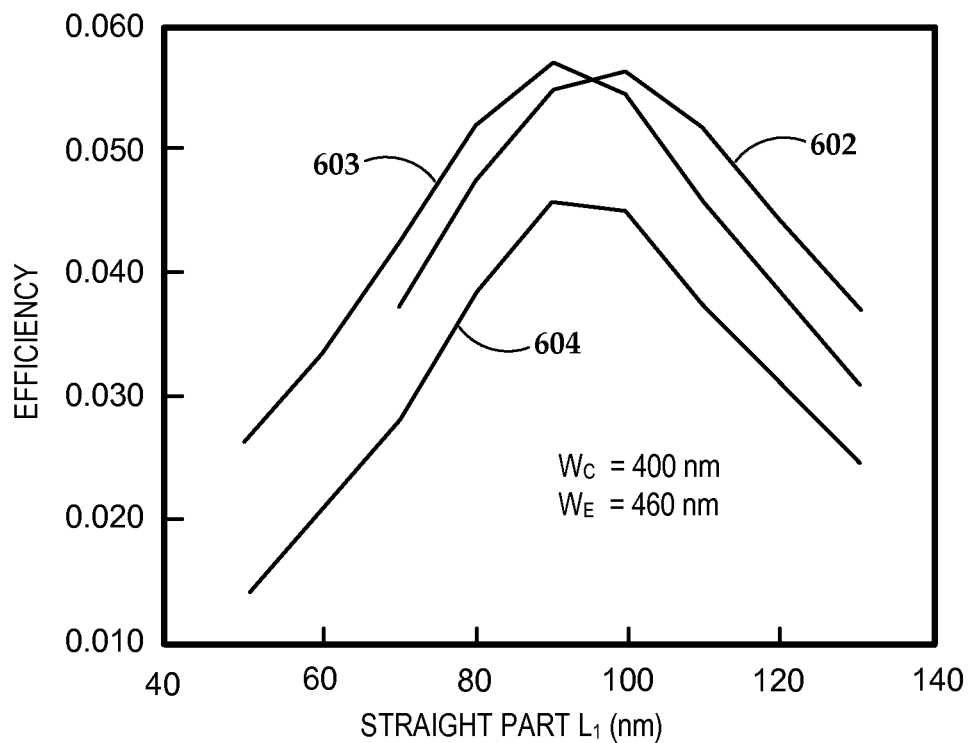

Parameters used to obtain results shown in FIG. 6A ($W_c$ = 400 nm, $W_e$ = 460 nm)

| Curve Ref. No. | θ (311) |
|---|---|
| 602 | 53.1° |
| 603 | 67.4° |
| 604 | 90.0° |

Figure 6B:
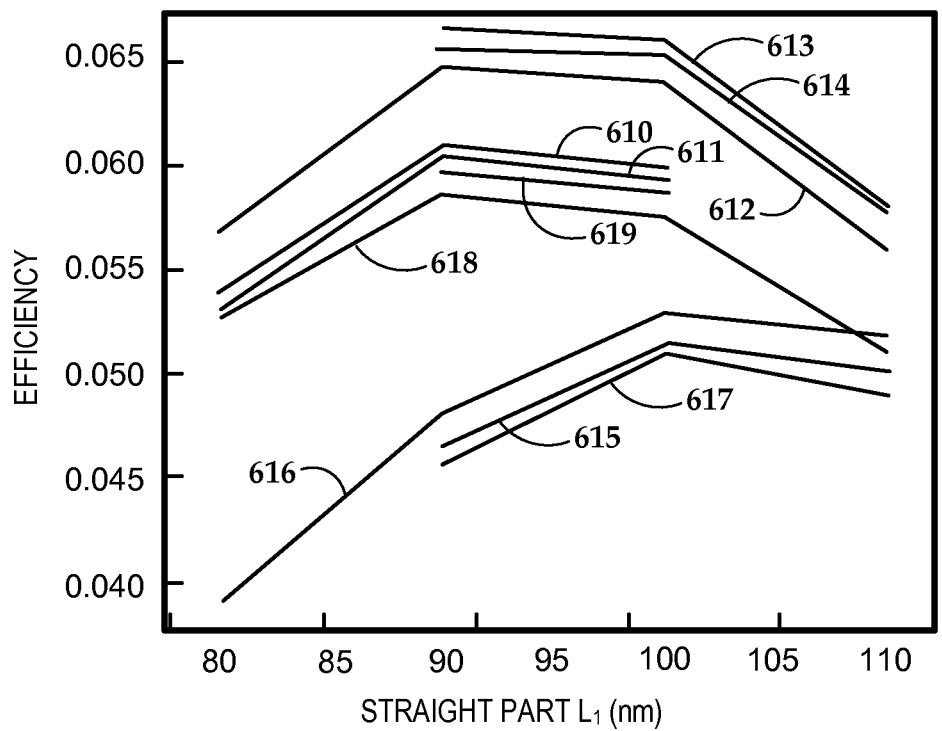

Parameters used to obtain results shown in FIG. 6B

| Curve Ref. No. | $W_c$ (317) | θ (311) | $W_e$ (309) |
|---|---|---|---|
| 610 | 500 nm | 67.4° | 460 nm |
| 611 | 600 nm | 67.4° | 460 nm |
| 612 | 400 nm | 53.1° | 360 nm |
| 613 | 500 nm | 53.1° | 360 nm |
| 614 | 600 nm | 53.1° | 360 nm |
| 615 | 400 nm | 53.1° | 300 nm |
| 616 | 500 nm | 53.1° | 300 nm |
| 617 | 600 nm | 53.1° | 300 nm |
| 618 | 400 nm | 43.6° | 300 nm |
| 619 | 500 nm | 43.6° | 300 nm |

Figure 7A:
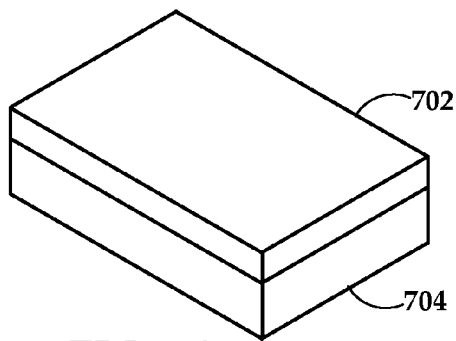
FIGS. 7A-7F and 8A-8C are perspective views showing manufacturing processes for waveguide and near field transducer arrangements according to example embodiments.
Figure 7B:
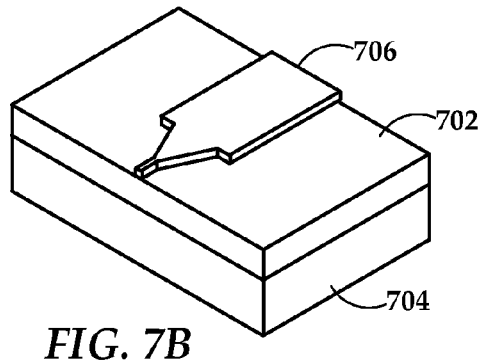

In reference now to FIGS. 7A-7F and 8A-8C, perspective views illustrate a fabrication process that can be used to form an NFT and waveguide according to example embodiments. In FIG. 7A, a layer 702 of dielectric waveguide core material is deposited on a substrate 704. The thickness of this layer may be dictated by the height (z-direction) of the channel waveguide, which in the previously illustrated examples is 200 nm, but could vary depending on factors such as waveguide width, target wavelength, NFT dimensions, etc. In FIG. 7B, a pattern 706 is placed over the core material 702. This pattern 706 may include photo-resist with or without a hard mask such as amorphous carbon (aC). The shape of the pattern 706 corresponds to an xy-projection of waveguide core portions 312, 314, and 314A as shown in FIG. 3B.

Figure 7C:
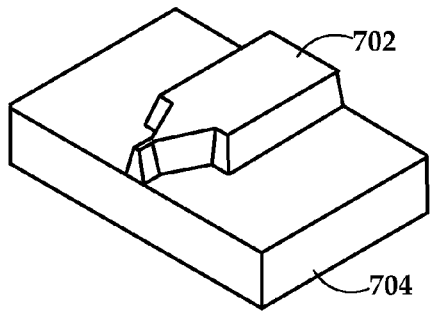
Figure 7D:
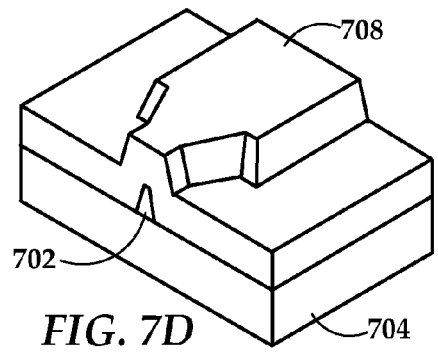

Using a reactive-ion etching technique such as inductively coupled plasma (ICP), parts of the core layer 702 not covered by pattern 706 are etched away. In this example, the wall angle is 15 degrees, although other angles may be used depending on the particular process and desired taper dimensions of the waveguide and/or NFT gap. The view of FIG. 7C illustrates the result of the etching after the pattern materials (e.g., photoresist and hardmask) have been removed. Next, as seen in FIG. 7D, a layer 708 of silica is deposited over the core material 702. Note that the thickness of this layer 708 will be dictated by the thickness of the waveguide core 702, the desired the distance between core 702 and NFT elements, and the sidewall angle of the waveguide core and/or NFT gap. In this example, the thickness of layer 708 is 290 nm.

Figure 7E:
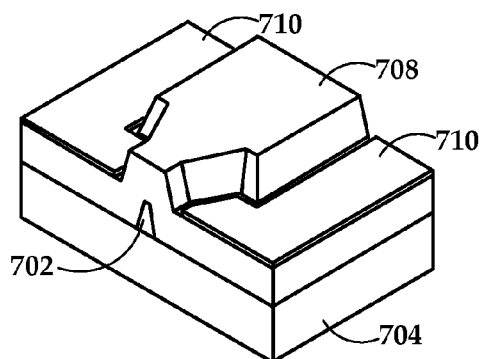
Figure 7F:
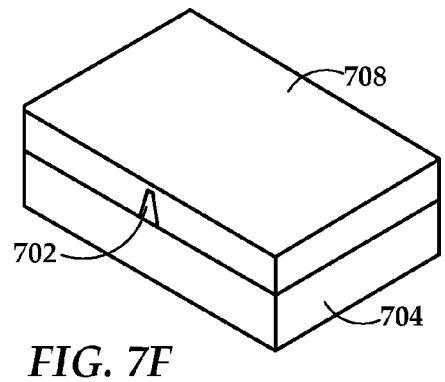
Figure 8A:
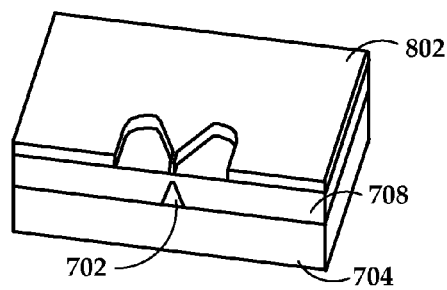
Figure 8B:
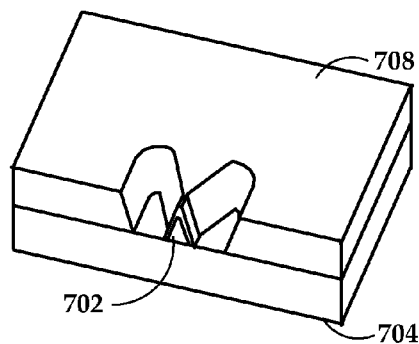
Figure 8C:
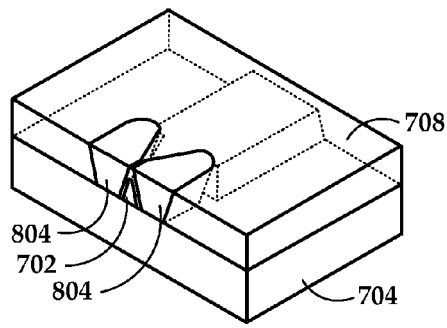
Figure 8D:
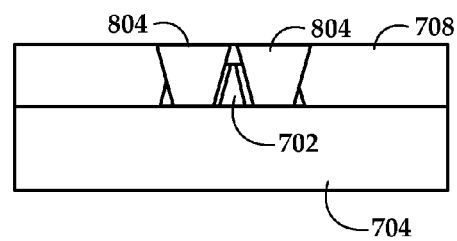
FIG. 8D is an air-bearing surface view of the waveguide and near field transducer arrangement shown in FIG. 8C.

As seen in FIG. 7E, a thin (e.g., 20 nm) layer 710 of aC hardstop is overlaid on part of the silica layer 708. This layer 710 may be patterned using photoresist and ashing to remove the material from the waveguide area. Afterwards, chemical-mechanical planarization (CMP) is used to make the silica layer flat. The hardstop is then ashed away, resulting in configuration seen in FIG. 7F. As seen in FIG. 8A, another photoresist layer 802 is placed over the silica layer 708. The shape of this photoresist layer 802 defines an outline of the metallic elements of the NFT (e.g., elements 302 shown in FIG. 3A). An ICP etch creates trenches in the silica layer 708, as seen in FIG. 8B, and gold is filled in the trenches to create the metallic NFT elements 804, which is shown in FIG. 8C. A side view of the final assembly as seen at the air-bearing surface (ABS) is shown in FIG. 8D. (Comment: ABS is the surface opposite to the recording media.)

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a near-field transducer that includes two metal elements configured as side-by-side plates on a substrate-parallel plane with a gap therebetween, the gap disposed along the substrate-parallel plane and having an output end at a media-facing surface, and an input end opposite the output end, the input end of the gap comprising a tapered portion having a larger gap dimension at the input end and a smaller gap dimension facing the output end; and
   a channel waveguide configured to deliver light to the input end of the near-field transducer, the channel waveguide having a core and cladding, wherein the larger gap dimension of the near-field transducer is larger than a corresponding width of the core and a portion of the core extends into the gap of the near-field transducer.

2. The apparatus of claim 1, wherein the portion of the core extending into the gap is tapered at least in the gap.

3. The apparatus of claim 2, wherein the portion of the core extends at least halfway between the input end and the output end of the gap.

4. The apparatus of claim 3, wherein the portion of the core extends to the media-facing surface.

5. The apparatus of claim 1, further comprising a material of low index of refraction between the portion of the core extending into the gap and the metal elements.

6. The apparatus of claim 1, wherein the portion of the core extends at least into the tapered portion of the gap.

7. The apparatus of claim 6, wherein the portion of the core is tapered to match the tapered portion of the gap.

8. The apparatus of claim 1, wherein the channel waveguide operates in a transverse electric mode.

9. The apparatus of claim 1, wherein the portion of the core extending into the gap is configured to match modes between the channel waveguide and the near-field transducer.

10. The apparatus of claim 1, wherein the apparatus comprises a heat-assisted magnetic recording slider.

11. An apparatus comprising:
    a near-field transducer that includes two metal elements configured as side-by-side plates on a substrate-parallel plane with a gap therebetween, the gap disposed along the substrate-parallel plane and having an output end at a media-facing surface, and an input end opposite the output end;
    a channel waveguide configured to deliver light to the input end of the near-field transducer, the channel waveguide comprising:
       a rectangular core portion that delivers the light from a light source to the input end of the near-field transducer, and
       a tapered core portion that extends into the gap of the near-field transducer.

12. The apparatus of claim 11, wherein the tapered core portion extends at least halfway between the input end and output end of the gap.

13. The apparatus of claim 12, wherein the tapered core portion extends to the media-facing surface.

14. The apparatus of claim 11, further comprising a material of low index of refraction between the tapered core portion and the metal elements.

15. The apparatus of claim 11, wherein the gap has a taper with a larger gap dimension at the input end and a smaller gap dimension facing the output end.

16. The apparatus of claim 15, wherein the tapered core portion extends at least into the taper of the gap.

17. The apparatus of claim 11, wherein the channel waveguide operates in a transverse electric mode.

18. The apparatus of claim 11, wherein the tapered core portion is configured to match modes between the channel waveguide and the near-field transducer.

19. The apparatus of claim 11, wherein the apparatus comprises a heat-assisted magnetic recording slider.

* * * * *